(12) United States Patent
Bruce

(10) Patent No.: US 6,210,488 B1
(45) Date of Patent: Apr. 3, 2001

(54) METHOD OF REMOVING A THERMAL BARRIER COATING

(75) Inventor: Robert W. Bruce, Loveland, OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/222,843

(22) Filed: Dec. 30, 1998

(51) Int. Cl.$^7$ ........................................................ B08B 3/12
(52) U.S. Cl. .................. 134/1; 216/101; 427/140; 134/19; 134/22.12; 134/22.13; 134/30
(58) Field of Search ................... 134/1, 19, 22.1, 134/22.12, 22.13, 30; 216/95, 100, 101, 102; 427/140; 29/402.18

(56) References Cited

U.S. PATENT DOCUMENTS

| | | | |
|---|---|---|---|
| Re. 35,611 | 9/1997 | McComas et al. | ............ 134/32 |
| 4,569,384 | * 2/1986 | Mills | .................. 164/131 |
| 4,997,522 | * 3/1991 | Shokoohi | ............ 156/659.1 |
| 5,643,474 | 7/1997 | Sangeeta | ................. 216/96 |

* cited by examiner

*Primary Examiner*—Randy Gulakowski
*Assistant Examiner*—Allan Olsen
(74) *Attorney, Agent, or Firm*—Andrew C. Hess; David L. Narciso

(57) ABSTRACT

A method of removing a thermal barrier coating from cooling holes in the surface of a component designed for use in a hostile thermal environment, such as the turbine, combustor and augmentor sections of a gas turbine engine. The method is particularly suited for completely removing a thermal insulating ceramic layer of a thermal barrier coating system that includes a metallic bond coat, such as a diffusion aluminide or MCrAlY coating, that bonds the ceramic layer to the component surface. Processing steps generally include removing the ceramic layer from the component surface surrounding the cooling hole, followed by removing that portion of the ceramic layer within the cooling hole by immersing the component in a liquid and then directing ultrasonic energy into the cooling hole.

12 Claims, 1 Drawing Sheet

METHOD OF REMOVING A THERMAL BARRIER COATING

FIELD OF THE INVENTION

The present invention relates to protective coatings for components exposed to high temperatures, such as components of a gas turbine engine. More particularly, this invention is directed to a method for removing a ceramic coating from the surface of a component and from cooling holes in the component surface without damaging the cooling hole or component surface.

BACKGROUND OF THE INVENTION

Components located in certain sections of gas turbine engines, such as the turbine, combustor and augmentor, are often thermally insulated with a ceramic layer in order to reduce their service temperatures, which allows the engine to operate more efficiently at higher temperatures. These coatings, often referred to as thermal barrier coatings (TBC), must have low thermal conductivity, strongly adhere to the article, and remain adherent throughout many heating and cooling cycles.

Coating systems capable of satisfying the above requirements typically include a metallic bond coat that adheres the thermal-insulating ceramic layer to the component. Metal oxides, such as zirconia ($ZrO_2$) partially or fully stabilized by yttria ($Y_2O_3$), magnesia (MgO) or other oxides, have been widely employed as the material for the thermal-insulating ceramic layer. The ceramic layer is typically deposited by air plasma spraying (APS), low pressure plasma spraying (LPPS), or a physical vapor deposition (PVD) technique, such as electron beam physical vapor deposition (EBPVD) which yields a strain-tolerant columnar grain structure. Bond coats are typically formed of an oxidation-resistant diffusion coating such as a diffusion aluminide or platinum aluminide, or an oxidation-resistant alloy such as MCrAlY (where M is iron, cobalt and/or nickel). Aluminide coatings are distinguished from MCrAlY coatings, in that the former are primarily aluminide intermetallic while the latter is a metallic solid solution that contains a mixture of phases, including NiAl.

Though significant advances have been made with coating materials and processes for producing both the environmentally-resistant bond coat and the thermal-insulating ceramic layer, there is the inevitable requirement to remove and replace the ceramic layer under certain circumstances. For example, removal may be necessitated by erosion or impact damage to the ceramic layer during engine operation, or by a requirement to repair certain features such as the tip length of a turbine blade. Removal of the ceramic layer may also be necessitated during component manufacturing to address such problems as defects in the coating, handling damage and the need to repeat noncoating-related manufacturing operations which require removal of the ceramic, e.g., electrical-discharge machining (EDM) operations.

The current state-of-the-art repair methods often result in removal of the entire TBC system, i.e., both the ceramic layer and bond coat, after which the bond coat and ceramic layer must be redeposited. Prior art abrasive techniques for removing thermal barrier coatings have generally involved grit blasting, vapor honing and glass bead peening, each of which is a slow, labor-intensive process that erodes the ceramic layer and bond coat, as well as the substrate surface beneath the coating. With repetitive use, these removal processes eventually destroy the component by reducing the wall thickness of the component. Damage is particularly likely when treating an air-cooled turbine blade, whose surface includes cooling holes from which cooling air is discharged in order to cool the external surfaces of the blade.

Consequently, significant effort has been directed to developing nonabrasive processes for removing ceramic coatings. One such method is an autoclaving process in which the ceramic coating is subjected to elevated temperatures and pressures in the presence of a caustic compound. This process has been found to sufficiently weaken the chemical bond between the ceramic and bond coat oxide layers to permit removal of the ceramic layer while leaving the bond layer intact. However, this process is incapable of removing ceramic from the cooling holes of an air-cooled turbine blade. Another method for removing a ceramic layer involves the use of a high pressure waterjet, as reported in U.S. Pat. No. 5,167,721. While this waterjet technique is described as not removing the bond coat, in practice the waterjet can inflict significant damage to bond coats and particularly diffusion aluminide bond coats, which are brittle beneath about 1200° F. (about 650° C.). Damage generally occurs by the fracturing of brittle phases in the bond coat, such as $PtAl_2$ phases of a platinum-aluminide bond coat, and/or the additive layer, which is the outermost bond coat layer containing an environmentally-resistant intermetallic phase MAl, where M is iron, nickel or cobalt, depending on the substrate material. Similar to grit blasting techniques, bond coat damage from the waterjet process is particularly likely when treating an air-cooled turbine blade. Damage can be acute around the cooling holes of these blades because ceramic within the holes is anchored by compressive stresses that develop when the newly coated component cools from typical coating temperatures for ceramic deposited by PVD techniques. Consequently, to remove the ceramic from a cooling hole, excessive dwell times are required to overcome this strong mechanical bond as well as the chemical bond between the ceramic and oxide layers, resulting in significant damage or removal of the bond coat in and around the cooling holes.

Accordingly, what is needed is a process capable of removing a ceramic layer from a cooling hole of an air-cooled component without damaging the cooling hole.

SUMMARY OF THE INVENTION

According to the present invention, there is provided a method of removing a thermal barrier coating on a component designed for use in a hostile thermal environment, such as turbine, combustor and augmentor components of a gas turbine engine. The method is particularly suited for completely removing a thermal-insulating ceramic layer of a thermal barrier coating system that includes a metallic bond coat, such as a diffusion aluminide or MCrAlY coating, between the surface of the component and the ceramic layer. The method of this invention entails a technique by which ceramic material within cooling holes in the component can be removed without damaging the cooling hole or the bond coat beneath the ceramic layer.

The processing steps of this invention generally include removing the ceramic layer from the surface of the component surrounding the cooling hole, followed by removing that portion of the ceramic layer present within the cooling hole by immersing the component in a liquid and then directing ultrasonic energy into the cooling hole. Preferred liquids include glycerol and water containing a thickening agent, either of which may include a surfactant. A preferred process for removing the ceramic layer from the surface of the component is an autoclaving process by which the ceramic layer is subjected to a caustic solution at an elevated temperature and pressure.

Using the method of this invention, the ceramic layer is completely removed from the component and any cooling holes, with essentially no degradation of the bond coat. Accordingly, this invention allows deposition of a new ceramic coating on components in production without refurbishment or replacement of the bond coat and without depositing additional ceramic in the cooling holes, which would be detrimental to the performance of the component. If the component has been in service, such that the bond coat has been partially depleted as a result of oxidation, the bond coat can be refurbished by an aluminizing technique, such as pack cementation or vapor phase aluminizing technique. Refurbishment by aluminizing is applicable to both diffusion aluminide and MCrAlY bond coats. Ceramic material can then be deposited on the surface of the refurbished bond coat so as to form a new insulating ceramic layer. The autoclave process of this invention also serves to remove any oxides from internal blade surfaces, allowing for the possibility of rejuvenation of internal coating as well during the aluminizing process.

Importantly, prior art techniques for removing a ceramic layer of a TBC have not enabled the above-noted refurbishment technique for air-cooled components, in that such techniques either cannot remove ceramic from the cooling holes or excessively damage the bond coat in the process. As a result of this invention, the labor, processing and costs required to refurbish a thermal barrier coating system are significantly reduced by avoiding damage and removal of the bond coat. In addition, the service life of a component can also be extended by avoiding replacement of its entire thermal barrier coating system, since removal of a bond coat results in loss of wall thickness because bond coats are inter-diffused with their blade substrates. Another significant advantage is that the process of this invention is less costly and time-consuming than if a waterjet were used to remove the ceramic layer from the component surface and cooling hole. Furthermore, because the present invention is able to completely remove ceramic from a cooling hole, the performance of an air-cooled component treated with this invention is promoted by the restored uniform film cooling of the component surfaces.

Other objects and advantages of this invention will be better appreciated from the following detailed description.

DETAILED DESCRIPTION OF THE INVENTION

Figure 1:
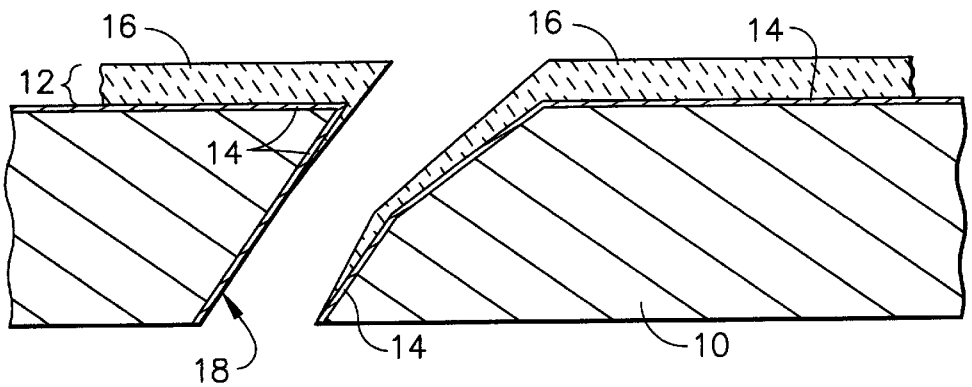
FIG. 1 is a sectional view of a gas turbine engine blade on which is formed a thermal barrier coating system comprising a ceramic layer adhered to the surface of the blade with a bond coat, with the coating system shown extending into a cooling hole in the blade.
Figure 2:
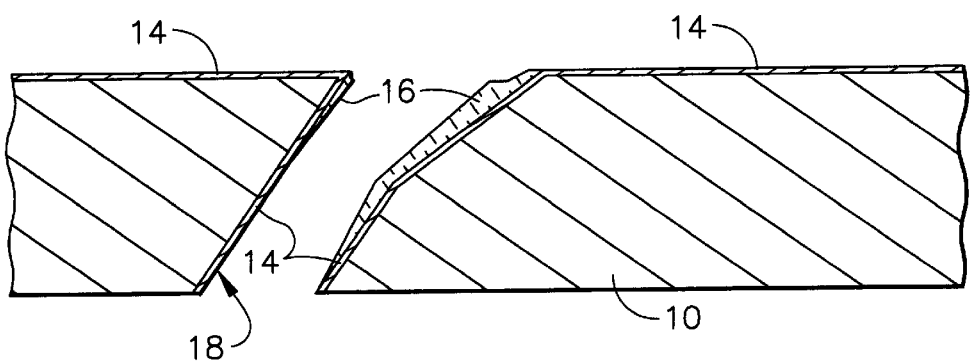
FIG. 2 represents a cross-sectional view of the blade following removal of the ceramic layer from the surface of the blade in accordance with this invention.
Figure 3:
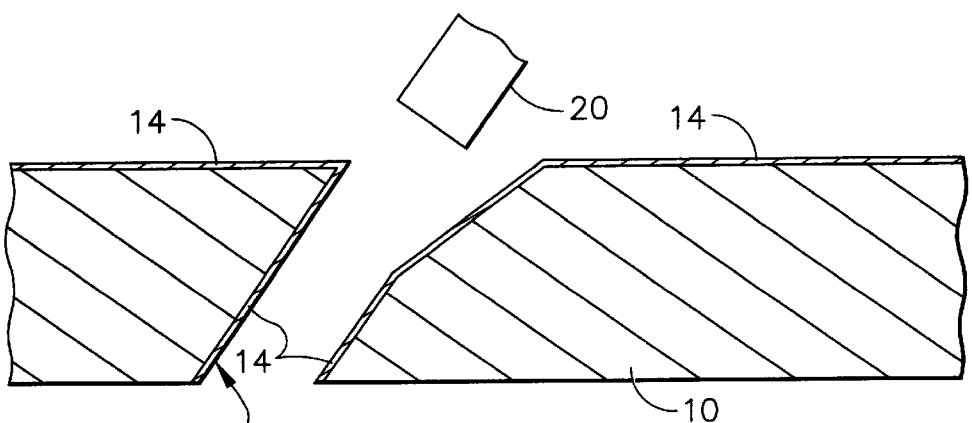
FIG. 3 represents a cross-sectional view of the blade following removal of the ceramic layer from the cooling hole in accordance with this invention.

FIGS. 1 through 3 represent cross-sectional views of an air-cooled turbine blade 10 of a gas turbine engine. The blade 10 is shown as having a thermal barrier coating system 12 composed of a ceramic layer 16 on a bond coat 14. Also shown in FIGS. 1 through 3 is a cooling hole 18 whose wall is partially coated by the bond coat 14 and ceramic layer 16. The method of this invention is directed to removing the ceramic layer 16 from the surface of the blade 10 and the cooling hole 18 without damaging the bond coat 14 or the cooling hole 18.

As is the situation with high temperature components of a gas turbine engine, the blade 10 may be formed of an iron, nickel or cobalt-base superalloy. The bond coat 14 is an oxidation-resistant composition such as a diffusion aluminide and/or MCrAlY, both of which form an alumina ($Al_2O_3$) layer or scale (not shown) on its surface during exposure to elevated temperatures. The alumina scale protects the underlying superalloy substrate from oxidation and provides a surface to which the ceramic layer 16 more tenaciously adheres. The ceramic layer 16 can be deposited by physical vapor deposition using techniques known in the art, e.g., EBPVD, to yield a strain-tolerant columnar grain structure. Alternatively, the ceramic layer 16 could be deposited by other known processes, such as air plasma spraying (APS) and low pressure plasma spraying (LPPS). A preferred material for the ceramic layer 16 is zirconia partially stabilized with yttria (yttria-stabilized zirconia, or YSZ), though zirconia fully stabilized with yttria could be used, as well as zirconia stabilized by other oxides, such as magnesia (MgO), calcia (CaO), ceria ($CeO_2$) or scandia ($Sc_2O_3$).

The method of this invention entails removing the ceramic layer 16 without removing or damaging the bond coat 14 and without damaging the cooling hole 18, so that a new ceramic layer can be deposited on the surface of the blade 10. As evident from FIG. 1, removal of the ceramic layer 16 is complicated by the presence of ceramic material in the cooling hole 18, an inevitable result of the cooling hole 18 being present in the blade 10 when the ceramic layer 16 was deposited. According to this invention, the ceramic layer 16 at the surface of the blade 10 is preferably removed (FIG. 2) by exposure to a caustic solution at an elevated temperature and pressure, generally in accordance with U.S. Pat. No. 5,643,474 to Sangeeta. Such a process is preferably carried out in an autoclave operated at a temperature of about 150° C. to about 300° C. and a pressure of about 100 psi to about 3000 psi (about 0.7 MPa to about 21 MPa). Preferred caustic compounds for this process are potassium hydroxide (KOH), sodium hydroxide (NaOH), ammonium hydroxide ($NH_4OH$), lithium hydroxide (LiOH), triethylamine (($C_2H_5)_3N$; TEA), tetramethylammonium hydroxide (($CH_3)_4NOH$; TMAH), and mixtures thereof. A duration of about two to about eight hours is generally sufficient to weaken the chemical bond between the ceramic layer 16 and the alumina scale on the bond coat 14, though it is foreseeable that longer or shorter durations may be preferred depending on the properties of the particular coating system.

Following the autoclave step, the cooling hole 18 is immersed in glycerol, water or an aqueous solution, and then subjected to directed ultrasonic energy, which locally treats the hole 18 instead of the entire blade 10. While various fluids could be used as the contact medium for this step, water is preferred as being environmentally safe and because it will not chemically affect the bond coat 14 or the underlying superalloy substrate. According to the invention, preferred contact media have viscosities greater than that of water, generally in the range of about 5 cSt to about 500 cSt, necessitating that the water contain a thickening agent. While it is foreseeable that various thickening agents could be used, natural water-soluble gum compounds have been successfully employed with this invention. The contact media may also contain surfactants and/or other additives that further enhance the effectiveness of the ultrasonic treatment.

In one embodiment, an organic water-soluble gum was added to deionized water in an amount of about 4% by weight. A turbine blade with cooling holes plugged with residual ceramic from a TBC was then immersed in the aqueous gum solution, and the cooling hole locally subjected to ultrasonic energy at a level of about 500 W for a duration of about thirty seconds using a handheld ultrasonic wand (represented in FIG. 3 with reference number 20) available from Sonics and Materials under the name VCX 600. More generally, ultrasonic energy at levels of about 200 W to about 1000 W could be used, with the ultrasonic treatment continuing for as long as required to remove the ceramic. Durations of not more than about one minute are generally believed to be adequate to overcome the compressive stresses that otherwise mechanically anchor the ceramic in the cooling hole 18.

In practice, this invention has successfully removed ceramic from cooling holes without removing or damaging the metallic bond coat underlying the ceramic in the cooling hole. According to this invention, once a ceramic layer has been removed from the surrounding surface area of the blade by the disclosed autoclave process, sufficiently high and localized ultrasonic energy is capable of overcoming the compressive stresses that mechanically anchored the ceramic in the cooling hole. The result of this process is that a blade that is essentially free of all residual ceramic on its surface and in the cooling hole, while the bond coat remains intact and undamaged. Consequently, this invention enables the ceramic layer of an air-cooled component to be completely replaced without accumulating additional ceramic in the cooling holes of the component and without damaging the bond coat, which would otherwise require additional processing steps to repair or replace the bond coat. The bond coat, whether a diffusion aluminide or MCrAlY-type, can then be refurbished using a diffusion aluminizing technique such as pack cementation or vapor phase aluminizing. Thereafter, a new ceramic layer can be deposited on the refurbished bond coat in accordance with known deposition methods.

While the invention has been described in terms of a preferred embodiment, it is apparent that other forms could be adopted by one skilled in the art. For example, other processes could possibly be used to degrade the chemical bond between the ceramic layer and bond coat prior to the ultrasonic treatment. Therefore, the scope of the invention is to be limited only by the following claims.

What is claimed is:

1. A method comprising the steps of:
    providing an air-cooled component with a thermal-insulating ceramic layer on a surface thereof, the component having a cooling hole that intersects the surface of the component, the cooling hole having a wall coated by a portion of the ceramic layer that extends into the cooling hole from the surface of the component, the portion of the ceramic layer being mechanically anchored within the cooling hole by compressive stresses;
    removing the ceramic layer from the surface of the component; and in a separate and subsequent step, removing the portion of ceramic layer from the cooling hole by immersing the cooling hole in a liquid and then directing ultrasonic energy into the cooling hole while the cooling hole remains immersed in the liquid.

2. A method as recited in claim 1, wherein the liquid is selected from the group consisting of glycerol, water, and water containing a thickening agent.

3. A method as recited in claim 1, wherein the ultrasonic energy is emitted from a handheld wand.

4. A method as recited in claim 1, wherein the step of removing the ceramic layer from the surface of the component entails an autoclaving process during which the ceramic layer is subjected to a caustic solution at an elevated temperature and pressure.

5. A method as recited in claim 1, wherein the compressive stresses that mechanically anchor the portion of the ceramic layer within the cooling hole are developed by depositing the ceramic layer on the component by physical vapor deposition.

6. A method as recited in claim 1, wherein the component further comprises a bond coat between the ceramic layer and the wall of the cooling hole, and wherein the step of removing the portion of ceramic layer from the cooling hole does not result in removal of the bond coat.

7. A method as recited in claim 1, wherein the component is a component of a gas turbine engine.

8. A method comprising the steps of:
    providing an air-cooled gas turbine engine component with a diffusion aluminide or MCrAlY bond coat on a surface thereof and a thermal-insulating ceramic layer adhered to the component by the bond coat, the component having a cooling hole that intersects the surface of the component, the cooling hole having a wall coated by portions of the bond coat and ceramic layer that extend into the cooling hole from the surface of the component, the portion of the ceramic layer being mechanically anchored within the cooling hole by compressive stresses;
    removing the ceramic layer from the surface of the component by subjecting the ceramic layer to a caustic solution at an elevated temperature and pressure; and then
    removing the portion of ceramic layer from the cooling hole by immersing the cooling hole in a solution having a viscosity greater than water, and then directing ultrasonic energy locally into the cooling hole while the cooling hole remains immersed in the solution.

9. A method as recited in claim 8, wherein the solution is selected from the group consisting of glycerol and water in which a thickening agent is dissolved.

10. A method as recited in claim 8, wherein the step of removing the ceramic layer from the surface of the component entails an elevated temperature of at least about 150 C. and an elevated pressure of at least about 0.7 MPa.

11. A method as recited in claim 8, wherein the caustic solution contains potassium hydroxide, sodium hydroxide, ammonium hydroxide, lithium hydroxide, triethylamine, tetramethylammonium hydroxide, or mixtures thereof.

12. A method as recited in claim 8, further comprising the step of depositing a ceramic layer on the surface of the component after removing the portion of ceramic layer from the cooling hole.

* * * * *